(12) United States Patent
Eilers et al.

(10) Patent No.: US 7,257,615 B2
(45) Date of Patent: Aug. 14, 2007

(54) SERVER SIDE EXECUTION OF APPLICATION MODULES IN A CLIENT AND SERVER SYSTEM

(75) Inventors: Bernd Eilers, Hamburg (DE); Thorsten Laux, Hamburg (DE)

(73) Assignee: Sun Microsystems, Inc., Menlo Park, CA (US)

( * ) Notice: Subject to any disclaimer, the term of this patent is extended or adjusted under 35 U.S.C. 154(b) by 702 days.

(21) Appl. No.: 10/024,950

(22) Filed: Dec. 19, 2001

(65) Prior Publication Data

US 2003/0018834 A1 Jan. 23, 2003

(30) Foreign Application Priority Data

Dec. 22, 2000 (EP) .................................. 00128216

(51) Int. Cl.
G06F 15/16 (2006.01)
(52) U.S. Cl. ....................................... 709/203; 709/219
(58) Field of Classification Search ........ 709/201–203, 709/217–219
See application file for complete search history.

(56) References Cited

U.S. PATENT DOCUMENTS

| | | | | |
|---|---|---|---|---|
| 5,619,697 A | * | 4/1997 | Nishida | 719/313 |
| 6,085,224 A | * | 7/2000 | Wagner | 709/203 |
| 6,311,221 B1 | * | 10/2001 | Raz et al. | 709/231 |
| 6,314,448 B1 | * | 11/2001 | Conner et al. | 709/202 |
| 6,453,362 B1 | * | 9/2002 | Bittinger et al. | 719/316 |
| 6,631,407 B1 | * | 10/2003 | Mukaiyama et al. | 709/223 |
| 6,654,949 B1 | * | 11/2003 | Fraenkel et al. | 717/130 |
| 2004/0210907 A1 | * | 10/2004 | Lau et al. | 719/310 |
| 2005/0010670 A1 | * | 1/2005 | Greschler et al. | 709/227 |

FOREIGN PATENT DOCUMENTS

| EP | 00128216.9 | 12/2000 |
|---|---|---|
| WO | WO 99/44123 | 9/1999 |
| WO | WO 00/62161 | 10/2000 |

OTHER PUBLICATIONS

Reinhard Finsterwalder, "A Generic Client/Server Architecture For Disributed Web-Based Simulation Experimentation," *IEEE International*, Sep. 25-27. 2000, pp. 185-189.

Law et al., "Web-Enabling Legacy Applications," Department of Computer Science, City of Hong Kong, Dec. 14, 1998, pp. 218-225.

Evans et al., "Using Java Applets and Cobra for Multi-User Distributed Applications," University of Texas at Austin, May 1997, pp. 43-55.

* cited by examiner

*Primary Examiner*—Krisna Lim
*Assistant Examiner*—Yasin Barqadle
(74) *Attorney, Agent, or Firm*—Sonnenschein, Nath & Rosenthal

(57) ABSTRACT

Methods, system, and articles of manufacture consistent with the present invention provide for remote processing in a client/server system. A client has a first component of a service application and a server has a second component of the service application. The server sends a request to the client to execute the first component. The client initiates execution of the first component based on the received request. After initiating execution of the first component, the client instructs the server to initiate execution of the second component. Upon termination of execution of the second component, the server sends a completion indicator to the client indicating that the second component has terminated execution. The client terminates execution of the first component responsive to receipt of the completion indicator.

33 Claims, 6 Drawing Sheets

SERVER SIDE EXECUTION OF APPLICATION MODULES IN A CLIENT AND SERVER SYSTEM

CROSS-REFERENCE TO RELATED APPLICATIONS

This Application claims priority to the filing date of the following foreign patent application, which is incorporated herein by reference:

European Patent Application No. 00128216.9, entitled "SERVER SIDE EXECUTION OF APPLICATION MODULES IN A CLIENT AND SERVER SYSTEM", filed Dec. 22, 2000.

FIELD OF THE INVENTION

The present invention relates to client/server data processing environments, and in particular, the invention relates to server side execution of application modules.

BACKGROUND OF THE INVENTION

With the availability of communication networks connecting large numbers of data processing devices, an increasing number of applications and services for users are executed involving more than one data processing device. Applications executed on a plurality of data processing devices (i.e., distributed applications) often involve an exchange of data via communication networks, such as local area networks, such as company-wide intranets, or wide area networks, such as the Internet.

Distributed applications may, for example, include office applications for managing documents and data files, or may include applications for visualizing information, or may include banking applications.

A distributed application providing a service to a user may be executed with the involvement of a server data processing device and a client data processing device, which is operated by a user. The user may, for example, launch a distributed application by entering a corresponding command at the client data processing device. Certain parts (i.e., components or modules) of the distributed application may reside on the client data processing device and may invoke further parts or modules of the distributed application at the server data processing device. These parts can be, for example, code pieces, applets, servlets, or programs.

For example, if a user desires to edit a document, a program module at the client data processing device could initialize a screen of a display unit at the client for receiving information to be displayed and may instruct a program module at the server data processing device, via a network, to retrieve the requested document and to process the document as required (e.g., to bring the document into a screen format), and to return the document to the client data processing device to be displayed on a client display.

In the above described example, processing operations for the requested distributed application may to a large extent be executed at the server data processing device, allowing the client data processing device to maintain fewer resources, i.e., to maintain less storage space reserved for application program software, and to provide less processing capabilities. This may be practical in case the client data processing device is a small unit, such as a mobile device.

Even though the above-described example provides an advantage over maintaining all resources at a client data processing device, it still requires that the parts or program modules of the distributed application, which are required for handling data or instructions at the client data processing device, are maintained locally at the client data processing device. Otherwise, a required communication between the client data processing device and the server data processing device could not be established or maintained.

For example, it may still be required that the client data processing device maintains potentially larger modules for visualizing information and playback of information, and thus the client may still have to allocate considerable resources for storing corresponding application program modules and providing the necessary processing capabilities.

Further, if the distributed application is modified (e.g., if a new release version becomes available), the parts of the distributed application program residing at the client data processing device need to be updated in a potentially expensive, time consuming and cumbersome process.

An approach to solve this problem would be to divide application modules of the distributed application at the client data processing device into smaller partitions and to transfer at least some of the partitions to the server data processing device. Then, a first program module could be started at the client data processing device, connecting to the server data processing device, and instructing the server data processing device to execute the further modules of the distributed application, as outlined above.

However, in many distributed application, program modules available for performing the required data and information handling operations at the client data processing device stay active as long as they are needed for performing the required operations at the client data processing device. Such a program module would not await the completion of the execution of a further module of the distributed application performed at the server data processing device, leading to a loss of synchronization between the individual program modules of the distributed application.

Based on the above-described problems of data processing systems, it is therefore desirable to improve them.

SUMMARY OF THE INVENTION

Methods, systems, and articles of manufacture consistent with the present invention provide for synchronizing system resources during remote processing in a client/server system. In a client/server system, where part of a distributed application runs on a client and another part of the distributed application runs on a server, both parts of the distributed application remain active until both parts of the distributed application finish execution. In doing so, the client and the server remain synchronized while executing the distributed application.

In an example, a user at the client views a web page sent by the server. A part of a distributed application relating to the web page runs on the client as a plug-in, while another part of the distributed application runs on the server as a servlet. Until another web page is loaded into the server, both the client's plug-in and the server's servlet remain active in order to synchronize system resources. This reduces processing requirements at the client and reduces the cost of maintaining distributed applications.

In accordance with methods consistent with the present invention, a method in a data processing system having a client and a server is provided. The method is for remote processing at the client, the client having a first component of a service application, the server having a second component of the service application. The method comprises the steps of: receiving from the server a request to execute the first component; initiating execution of the first component based on the received request; after initiating execution of the first component, instructing the server to initiate execution of the second component; receiving a completion indicator from the server indicating that the second component has terminated execution; and terminating execution of the first component module responsive to receipt of the completion indicator.

In accordance with methods consistent with the present invention, a method in a data processing system having a client and a server is provided. The method is for remote processing at the client, the client having a first component of a service application, a web server having a second component of the service application. The method comprises the steps of: receiving from the server a web page with a request to execute the first component, the web page including a URL identifying the second component; initiating execution of the first component based on the received request; after initiating execution of the first component, instructing the server to initiate execution of the second component by returning the URL to the server; receiving a completion indicator from the server indicating that the second component has terminated execution; and terminating execution of the first component responsive to receipt of the completion indicator.

In accordance with methods consistent with the present invention, a method in a data processing system having a client and a server is provided. The method is for remote processing at the server, the client having a first component of a service application, a server having a second component of the service application. The method comprises the steps of: requesting the client to initiate execution of the first component and to return a client request to the server to initiate execution of the second component; receiving the request to initiate execution of the second component; initiating execution of the second component based on the received client request; determining when the second component has terminated execution; and when it is determined that the second component has terminated execution, sending an indication to the client that the second component has terminated execution to notify the client to terminate execution of the first component.

In accordance with methods consistent with the present invention, a method in a data processing system having a client and a server is provide. The method is for remote processing at the server, the client having a first component of a service application, the server having a second component of the service application. The method comprises the steps of: requesting the client to initiate execution of the first component and to return a client request to the server to initiate execution of the second component, the request to initiate execution of the first component contained in a web page having a URL identifying the second component; receiving the client request to initiate execution of the second component, the client request including the URL; initiating execution of the second component based on the received client request; determining when the second component has terminated execution; and when it is determined that the second component has terminated execution, sending an indication to the client that the second component has terminated execution to notify the client to terminate execution of the first component.

In accordance with articles of manufacture consistent with the present invention, a computer-readable medium containing instructions that cause a data processing system having a client and a server to perform a method for remote processing at the client is provided. The client has a first component of a service application, and the server has a second component of the service application. The method comprises the steps of: receiving from the server a request to execute the first component; initiating execution of the first component based on the received request; after initiating execution of the first component, instructing the server to initiate execution of the second component; receiving a completion indicator from the server indicating that the second component has terminated execution; and terminating execution of the first component responsive to receipt of the completion indicator.

In accordance with articles of manufacture consistent with the present invention, a computer-readable medium containing instructions that cause a data processing system having a client and a server to perform a method for remote processing at the client is provided. The client has a first component of a service application, and the server has a second component of the service application. The method comprises the steps of: receiving from the server a web page with a request to execute the first component, the web page including a URL identifying the second component; initiating execution of the first component based on the received request; after initiating execution of the first component, instructing the server to initiate execution of the second component by returning the URL to the server; receiving a completion indicator from the server indicating that the second component has terminated execution; and terminating execution of the first module responsive to receipt of the completion indicator.

In accordance with articles of manufacture consistent with the present invention, a computer-readable medium containing instructions that cause a data processing system having a client and a server to perform a method for remote processing at the server is provided. The client has a first component of a service application, and the server has a second component of the service application. The method comprises the steps of: requesting the client to initiate execution of the first component and to return a client request to the server to initiate execution of the second component; receiving the client request to initiate execution of the second component; initiating execution of the second component based on the received client request; determining when the second component has terminated execution; and when it is determined that the second component has terminated execution, sending an indication to the client that the second component has terminated execution to notify the client to terminate execution of the first component.

In accordance with articles of manufacture consistent with the present invention, a computer-readable medium containing instructions that cause a data processing system having a client and a server to perform a method for remote processing at the server is provided. The client has a first component of a service application, and the server has a second component of the service application. The method comprises the steps of: requesting the client to initiate execution of the first component and to return a client request to the server to initiate execution of the second component, the request to initiate execution of the first component contained in a web page having a URL identifying the second module; receiving the client request to initiate execution of the second component, the client request including the URL; initiating execution of the second component based on the received client request; determining when the second component has terminated execution; and when it is determined that the second component has terminated execution, sending an indication to the client that the second component has terminated execution to notify the client to terminate execution of the first component.

In accordance with systems consistent with the present invention, a client data processing system is provided. The client data processing system comprises: a memory comprising a service application with a first component and a second component, and a computer program that receives from a server a request to execute the first component, initiates execution of the first component based on the received request, instructs the server to initiate execution of the second component of the service application program located at the server after initiating execution of the first component, receives a completion indicator from the server indicating that the second component has terminated execution, and terminates execution of the first component responsive to receipt of the completion indicator; and a processing unit that runs the computer program.

In accordance with systems consistent with the present invention, a client data processing system is provided. The client data processing system comprises: a memory comprising a service application with a first component and a second component, and a computer program that receives from a server a web page with a request to execute the first component, the web page including a URL identifying the second module of the service application program located at the server, initiates execution of the first component based on the received request, after initiating execution of the first component, instructs the server to initiate execution of the second component by returning the URL to the server, receives a completion indicator from the server indicating that the second component has terminated execution, and terminates execution of the first component upon receipt of the completion indicator; and a processing unit that runs the computer program.

In accordance with systems consistent with the present invention, a server data processing system is provided. The server data processing system comprises: a memory comprising a service application having a first component and a second component, and a computer program that requests a client to initiate execution of the first component of the service application program located at the client and to return a client request to initiate execution of the second component, receives the client request to initiate execution of the second component, initiates execution of the second component based on the received client request, determines when the second component has terminated execution, and when it is determined that the second component has terminated execution, sends an indication to the client that the second component has terminated execution to notify the client to terminate execution of the first component; and a processing unit that runs the computer program.

In accordance with systems consistent with the present invention, a server data processing system is provided. The server data processing system comprises: a memory comprising a service application having a first component and a second component, and a computer program that requests a client to initiate execution of a first component of the service application program located at the client and to return a client request to initiate execution of the second component, the request contained in a web page having a URL identifying the second component; receives the client request to initiate execution of the second module, the client request including the URL; initiates execution of the second module based on the received client request, determines when the second component has terminated execution, and when it is determined that the second component has terminated execution, sends an indication to the client that the second component has terminated execution to notify the client to terminate execution of the first component; and a processing unit that runs the computer program.

In accordance with systems consistent with the present invention, a data processing system having a client and a server is provided. The data processing system is for remote processing at the client, the client having a first component of a service application, the server having a second component of the service application. The data processing system comprises: means for receiving from the server a request to execute the first component; means for initiating execution of the first component based on the received request; means for, after initiating execution of the first component, instructing the server to initiate execution of the second component; means for receiving a completion indicator from the server indicating that the second component has terminated execution; and means for terminating execution of the first component responsive to receipt of the completion indicator.

In accordance with systems consistent with the present invention, a data processing system having a client and a server is provided. The data processing system is for remote processing at the client, the client having a first component of a service application, the server having a second component of the service application. The data processing system comprises: means for receiving from the server a web page with a request to execute the first component, the web page including a URL identifying the second component; means for initiating execution of the first component based on the received request; means for, after initiating execution of the first component, instructing the server to initiate execution of the second component by returning the URL to the server; means for receiving a completion indicator from the server indicating that the second component has terminated execution; and means for terminating execution of the first component responsive to receipt of the completion indicator.

In accordance with systems consistent with the present invention, a data processing system having a client and a server is provided. The data processing system is for remote processing at the server, the client having a first component of a service application, the server having a second component of the service application. The data processing system comprises: means for requesting the client to initiate execution of the first component and to return a client request to the server to initiate execution of the second component; means for receiving the client request to initiate execution of the second component; means for initiating execution of the second component based on the received client request; means for determining when the second component has terminated execution; and means for, when it is determined that the second component has terminated execution, sending an indication to the client that the second component has terminated execution to notify the client to terminate execution of the first component.

In accordance with systems consistent with the present invention, a data processing system having a client and a server is provided. The data processing system is for remote processing at the server, the client having a first component of a service application, the server having a second component of the service application. The data processing system comprises: means for requesting the client to initiate execution of the first component and to return a client request to the server to initiate execution of the second component, the request contained in a web page having a URL identifying the second component; means for receiving the client request to initiate execution of the second component, the client request including the URL; means for initiating execution of the second component based on the received client request; means for determining when the second component has terminated execution; and means for, when it is determined that the second component has terminated execution, sending an indication to the client that the second component has terminated execution to notify the client to terminate execution of the first component.

The above-mentioned and other features, utilities, and advantages of the invention will become apparent from the following detailed description of the preferred embodiments of the invention together with the accompanying drawings.

Other systems, methods, features, and advantages of the invention will become apparent to one with skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Figure 1:
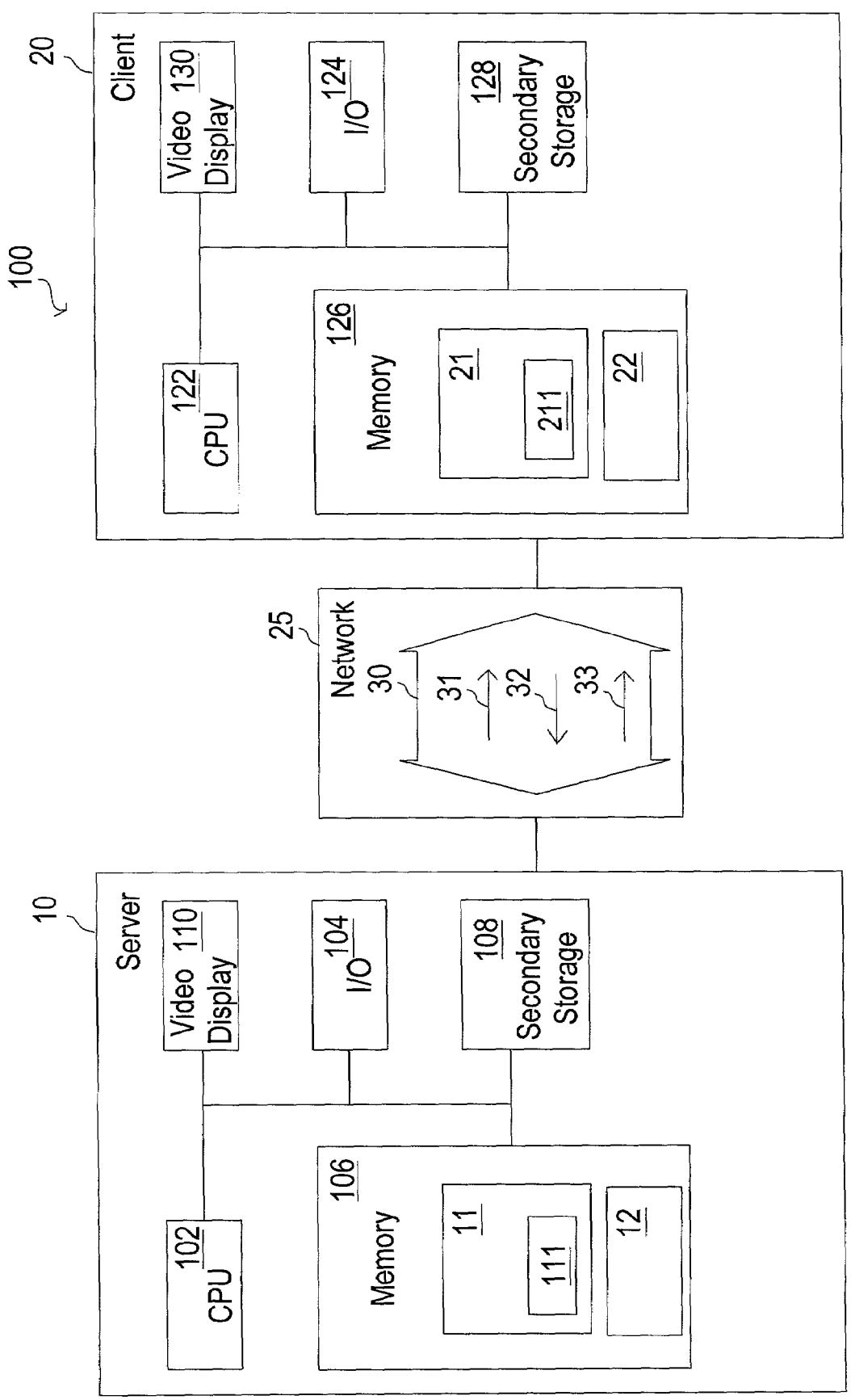
FIG. 1 depicts a block diagram of a client/server based data processing system with which embodiments of the present invention by be implemented.

The accompanying drawings, which are incorporated in and constitute a part of this specification, illustrate an implementation of the invention and, together with the description, serve to explain the advantages and principles of the invention. In the drawings, In accordance with methods, systems, and articles of manufacture consistent with the present invention, system resources of a client/server system are synchronized during remote processing. In a client/server system, where part of a distributed application (i.e., a service application) runs on a client and another part of the distributed application runs on a server, both parts of the distributed application remain active until both parts of the distributed application finish execution. In doing so, the client and the server remain synchronized while executing the distributed application.

In an example, a user at the client views a web page sent by the server. A part of a distributed application relating to the web page runs on the client as a plug-in, while another part of the distributed application runs on the server as a servlet. Until another web page is loaded into the server, both the client's plug-in and the server's servlet remain active in order to synchronize system resources.

FIG. 1 depicts a block diagram of a client/server based data processing system 100 with which methods, systems, and articles of manufacture consistent with the present invention may be implemented. A server computer system 10 and a client computer system 20 are each connected to a network 25, such as a Local Area Network, Wide Area Network, or the Internet. Client computer system 20 is illustrated as communicating with server computer system 10, as indicated by arrow 30.

Server computer system 10 comprises a central processing unit (CPU) 102, an input output I/O unit 104, a memory 106, a secondary storage device 108, and a video display 110. Server computer system 10 may further comprise standard input devices such as a keyboard, a mouse or a speech processing means (each not illustrated). Server computer system 10 may be, for example, a web server.

Memory 106 contains a server processing program 11 and a server communication program 12. The server processing program 11 includes a server module 111 comprising part of a service application for distributed execution involving the server computer system 10. Each of these programs will be described in more detail below. These programs may comprise or may be included in one or more code sections containing instructions for performing their respective operations. While these programs are described as being implementation as software, however, the present implementation may be implemented as a combination of hardware and software or hardware alone. Also, one of skill in the art will appreciate that these programs may comprise or may be included in a data processing device, which may be a server, communicating with server computer system 10.

The server computer system may be a general purpose data processing unit, such as a data processing unit with large resources (e.g., high processing capabilities and a large memory for storing large amounts of data). The server computer system may be a single unit or may be a distributed system of a plurality of servers or data processing units and may be shared by multiple users operating a plurality of client computer systems such as client computer system 20.

The server computer system includes the server processing program 11 for executing the server module 111 of the service application upon request from the client module 211, as described above. Similar to the client processing program, the server processing program 11 may be constituted by the central processing unit 102 of the server unit 10, but may also be constituted by a distributed central processing unit including a plurality of individual processors on one or a plurality of machines. Server processing program 11 may have access to secondary storage 108 for storing a plurality of server modules such as server module 111, of a plurality of service applications, in order to provide service to a plurality of users operating a plurality of client computer systems such as the client computer system 20. Secondary storage 108 may be a single unit or a distributed unit, e.g., a data base.

The server computer system further includes server communication program 12, which may be similar to client communication program 22. However, server communication program 12 may be adapted to communicate with a plurality of client computer systems such as client computer system 20, i.e., to maintain communication links to a plurality of client computer systems.

Server processing program 11 and server communication program 12 may be connected by, for example, a system bus (not shown) or via external connections, for example, in a case where the server computer system comprises a distributed system including distributed server data processing programs or distributed server communication programs.

Client computer system 20 comprises a central processing unit (CPU) 122, an input output I/O unit 124, a memory 126, a secondary storage device 128, and a video display 130. Client computer system 20 may further comprise standard input devices such as a keyboard, a mouse or a speech processing means (each not illustrated).

Memory 126 contains a client processing program 21 and a client communication program 22. The client processing program 21 includes a client module 211 comprising part of a service application for distributed execution involving the server computer system 10 and the client computer system 20. Each of these programs will be described in more detail below. These programs may comprise or may be included in one or more code sections containing instructions for performing their respective operations. While these programs are described as being implementation as software, however, the present implementation may be implemented as a combination of hardware and software or hardware alone. Also, one of skill in the art will appreciate that these programs may comprise or may be included in a data processing device, which may be a server, communicating with client computer system 20.

The client computer system may be a general purpose data processing device, such as a personal computer, a mobile terminal such as a mobile computing device, a mobile phone, or a mobile data organizer operated by a user wishing to obtain service provided by the service application.

The client processing unit 21 may have access to secondary storage 108 for storing client module 211 of the service application and further client modules of further service applications. Secondary storage 108 may be located within the client computer system or external thereto. Secondary storage 108 may be a single unit or a distributed unit, e.g., a data base. One of skill in the art will appreciate that the client processing program 21 may be adapted to execute a plurality of client modules of a plurality of service applications in providing at least one service to a user.

Client processing program 21 and client communication program 22 may be connected by a link (not shown), which may be a communication bus internal to the client computer system, and which may include an adapter to a keyboard, or may include external connections.

Client communication program 22 of the client computer system communicates with the server computer system, e.g., via the network or a dedicated communication link. Client communication program 22 may be an adapter unit capable of executing various communication protocols in order to establish and maintain a communication with the server computer system, i.e., with server communication program 12. The adapter unit may, for example, be a modem or terminal adapter including control software, for example, executed at client processing program 11 or at another data processing device. Client communication program 22 may further comprise a piece of hardware or a general data processing unit executing corresponding program instructions. It is also possible that client communication program 22 is at least partially included in client processing program 21 executing corresponding program instructions.

Client communication program 22 may communicate over a communication link using a communication end point specified by an address and a port number. The link may be a dedicated communication link, such as a mobile communication link or a switched circuit communication link. Further, the communication link may involve a network of data processing devices, such as a local area network or a wide area network or combinations thereof.

Although aspects of one implementation are depicted as being stored in memory, one skilled in the art will appreciate that all or part of systems and methods consistent with the present invention may be stored on or read from other computer-readable media, such as storage medium secondary storage devices, like hard disks, floppy disks, and CD-ROM; and transmission media such as a carrier wave received from a network such as the Internet; or other forms of ROM or RAM either currently known or later developed. Further, although specific components of client-server based data processing system 100 have been described, one skilled in the art will appreciate that a data processing system suitable for use with methods, systems, and articles of manufacture consistent with the present invention may contain additional or different components. Also, the server computer system can serve a plurality of clients communicating with the server computer system.

In operation, for example, server communication program 12 transmits to the client computer system an instruction to execute client module 211 of the service application, and receives a request to execute server module 111 of the service application. Further, server processing program 11 executes the server module 111 and generates a completion indicator indicating that the execution of the server module 111 is completed. The server communication program 12 then transmits the completion indicator to the client computer system, notifying the client computer system that client module 211 may be released.

In an example, a client at the client views a web page sent by the server. Client module 211 of the service application relating to the web page runs on the client as a plug-in, while server module 111 runs on the server as a servlet. Until another web page is loaded into the server, both the client's plug-in and the server's servlet remain active in order to synchronize system resources.

On the other hand, client communication program 22 of the client computer system, in this example, receives from the server computer system the request to execute client module 211 of the service application. Client processing program 21 executes client module 211, including transmitting an indicator of server module 111 of the service application to the server computer system, to instruct the server computer system to execute server module 111 of the service application. And, client communication program 22 receives the completion indicator from the server computer system, indicating that the execution of server module 111 is completed, and then releases client module 211 after the completion indicator was received from the server computer system.

The instruction for client module 211 transmitted from the server computer system to the client computer system unit is illustrated by an arrow 31. Further, the request for server module 111 generated by client module 211 upon receiving the instruction, as indicated by arrow 31, is transmitted to the server computer system as illustrated by an arrow 32. Also, the completion indicator is transmitted to the client computer system as indicated by an arrow 33, after the execution of server module 111 is completed at the server computer system.

The above described example allows the activation of client module 211 from the server computer system through instruction 31. Accordingly, since client module 211 is started via the server computer system, client module 211 will remain active, after requesting server module 111 to be activated by instruction 32, until server module 111 is completed and the server computer system transmits the completion indicator 33 back to the client computer system.

Since the service application is only partially executed at the client computer system, computational requirements at the client computer system are reduced. Thus, for example, a smaller client computer system having a reduced storage capability and reduced processing capabilities may be employed.

Further, since server module 111 can be maintained at the server computer system, server module 111 can directly be serviced and updated at the server computer system. This eliminates the need for updating the entire service application directly at the client computer system. One of skill in the art will appreciate that the service application may include a plurality of client modules and server modules.

In the following, an example of a service application including client module 211 and server module 111 will be described. It is noted that the following examples are merely illustrative and do not limit the methods, systems, or articles of manufacture consistent with the present invention. Additional examples of service applications including client modules and server modules are possible.

The service application may generally be an application that allows a user operating the client computer system to establish a session with the server computer system. Further, the service application may provide a user with the required tools to control the execution of a distributed application such as an editing operation, rendering operations, a banking application, or other applications, which may, for example, be needed in an office environment.

The service application may be a support application forming part of a distributed application performed under control of the user operating the client computer system. However, the service application is not limited thereto. It may also be a standalone application for providing service to a user operating the client computer system.

The service application may generally include at least one operation of the group consisting of:

a print operation for printing information, such as printing a document through the client computer system, for example, on a printer connected to the client computer system;

a visualization operation for visualizing information at the client computer system;

a storing operation for storing information at the client computer system or at the server computer system;

a rendering operation for rendering a data file, i.e., converting between different formats; and mathematical or logical operations.

In the following, an example of a print service application is described in further detail.

In a print service application, as listed above, the document itself and processing of the document may be take place at the server computer system, which may involve converting the document into a data format suitable for printing at the client computer system and transmitting corresponding information to the client computer system.

The document to be printed is maintained at the server computer system or at a database accessible by the server computer system. Operations for converting the document into a printable format may be executed at the server computer system. Therefore, the server computer system may provide for converting the document to be printed into a suitable format, selecting and preparing certain partitions of the document to be printed, and other functions. Thus, the print service application may include a server module with the above functions.

The client computer system may provide for requesting execution of the server module and, for example, receiving data in a printable format, and forwarding the data in the printable format to a printer connected to the client computer system. Further, the client module may provide for further conversion operations of the received data before transfer to the printer. Thus, the print service application may include a client module with the above functions.

Further, the client computer system may provide for receiving an instruction from the server computer system to execute the client module of the print service application. As the client module is started upon a request from the server computer system, and itself requests the execution of the server module, the client module is maintained active at the client computer system until the completion indicator from the server module is received. This maintains the synchronization between the server module and the client module. In other words, the printing operation may successfully be carried out. Maintaining the client module active may include maintaining corresponding register entries and memory allocations at the client computer system, e.g., using the client processing unit.

It is noted that if the client module was released before completion of the execution of the server module, synchronization can not be maintained and, for example, data to be printed may be lost as the routing operations of the client module can not be performed.

In the following an example of a visualization service application is described in further detail.

A visualization service application may prepare, at the server computer system, screen contents to be provided for local display at the client computer system's video display 130. The visualization service application's preparation of screen contents may include rendering information such as a web page, such that the information of the web page can be presented to the user of the client computer system. Since client computer systems may have a variety of display units connected thereto (e.g., various sizes and display characteristics (color, gray scale)), the rendering operations may include adapting formats, converting colors into gray scale and other adaptations.

Further, the visualization service application prepares the above-described contents for transfer to the client computer system, to receive the screen contents at the client computer program, and to locally display the screen contents.

Therefore, the visualization service application of a document, such as a web page, may be divided into a server module involving the above-described rendering operations to adapt formats and colors, whereas the client module may include functions to receive frames for local display on the video display.

Similarly, a storing service application may be divided into a server module including operations to convert formats and a client module instructing the execution of the server module and, if necessary, performing functions in routing data to be stored, for example on a local storage device accessible through the client cpmuter system.

Further, rendering operations for rendering a data file (e.g., conversion between different formats) may be divided into a client module and a server module, and mathematical and logical operations may also be divided into a server module and a client module.

Similar allocations of functionality may be used in further types of service applications.

In an example, a browser is used in a session involving the client computer system and the server computer system. The communication between the server computer system and the client computer system involves a computer network such as the Internet and various protocols for establishing and maintaining a communication between the server computer system and the client computer system, such as TCP/IP.

The execution of the service application is performed through a browser application, as available for browsing information and performing operations in a network such as a local area network (e.g., a company-wide network) or a wide area network (e.g., the Internet), including the world-wide web.

A browser application is an application that provides to a user an interface for retrieving documents and performing operations on documents, as described above. A browser typically has access to locally stored or externally provided programs, which may comprise client modules of a service application. However, a browser generally maintains a locally stored or externally provided application program, such as a client module (plug-in, applet, active X control), active only for a certain time period. Most importantly, whenever a new web page is loaded into the browser, e.g., if a user selects another page for display, the browser generally unloads a previously used program such as a client module, i.e., execution of such a program is terminated.

In accordance with methods, systems, and articles of manufacture consistent with the present invention, there is provided the local program or client module are maintained active until a corresponding server module is completed. Since the execution of the client module is instructed through the server computer system, making the client module to request execution of the server module, the client module will not be unloaded by the browser until the server module has completed its operation and transmitted a completion indicator to the client computer system.

Further, since the instruction from the server computer system to the client computer system instructing the client computer system to execute the client module may include an identifier of the server module, no information on the exact nature or location of the server module needs to be maintained at the client computer system. Accordingly, updates required for updating program modules residing at the client computer system may be reduced to a minimum.

Further, in the above-described example, a URL (Uniform Resource Locator) may be used. The server computer system may send the browser at the client computer system a web page that activates the client module of the service application. The client module then in turn connects to the server computer system and may request a URL from the server computer system. The URL transmitted in response thereto from the server computer system to the client computer system may advantageously include an identifier of the server module of the service application. Upon receiving the URL at the client computer system, the client module transmits the URL to the server computer system requesting the execution of the server module specified in the URL.

The client module, which may be, for example, a plug-in, an applet or an active X control, stays active as long as the server computer system does not return information in servicing the URL. Generally, a plug-in or applet stays active until a return message to the URL, which may be data specified by the URL, is received. The client module, however, waits for the completion indicator as the return message to the URL and thus, since the server module only transmits the completion indicator to the client computer system upon completing the server module, the client module stays active as required, allowing to maintain a synchronization between the server computer system and the client computer system.

For example, in a visualization service application, as outlined above, the following sequence of operations may occur.

In a first operation, the server computer system sends a browser page to the client computer system including, for example, an icon "visualize document XYZ" and including a URL linked with the icon in the browser web page containing information on the server module, such as a module for rendering data appropriately to adapt a display frame to the client video display.

Upon selection of the icon included in the browser page, e.g., through a user input at the client computer system, the client computer system transmits the URL specifying the server module to the server computer system.

Upon receiving the URL, the server computer system executes the server module, for example, including rendering and all necessary data transmissions between the client computer system and the server computer system.

As the client now waits for a return message to the requested URL, the client module stays active until the completion indicator indicating completion of the server module is received at the client computer system.

Figure 2:
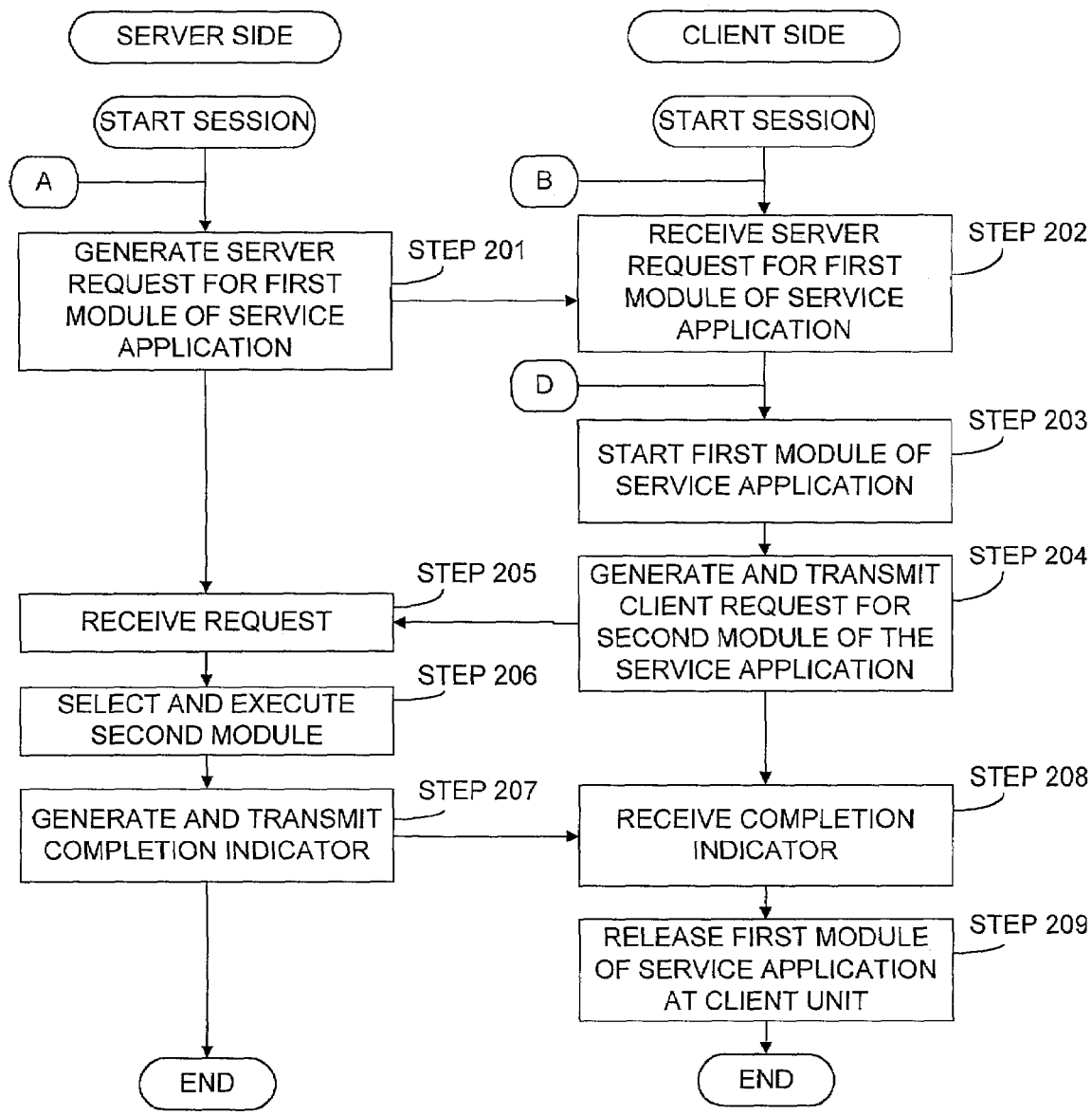
FIG. 2 depicts a flow diagram illustrating the steps for remote processing involving the client and the server, in accordance with methods, systems, and articles of manufacture consistent with the present invention.

FIG. 2 depicts a flow diagram illustrating exemplary steps for providing execution of a first module of a service application at a client computer system and execution of a second module of the service application at a server computer system, while maintaining a synchronization in executing the service application. On the left-hand side of FIG. 2, operations to be carried out at the server side are illustrated. On the right-hand side of FIG. 2, operations to be executed at the client side are illustrated. The operations of in FIG. 2 may be performed using the system 100 described with respect to FIG. 1, however, FIG. 2 is not limited thereto.

First, a communication session is started involving the server computer system and the client computer system. This may involve establishing a communication link between the client computer system and the server computer system using a communication protocol and may involve the transmission of data through a dedicated communication link, a communication network or combinations thereof.

After starting the session between the client computer system and the server computer system, server processing program 11 generates a server request indicating client module 211 of a service application (step 201).

As described above, a service application is a distributed application providing a service to a user involving the client computer system and the server computer system. A service application, for example, may include a visualization operation for visualizing information at the client computer system, may involve a print operation for printing information, for example locally at the client computer system, may include a storing operation for storing information either locally at the client computer system or at the server computer system or at a third location, may include rendering operations, for example for converting files between different formats and preparing information for display, and may include mathematical or logical operations.

The server request of step 201 may be generated upon initializing the session or may be triggered upon other events, such as client commands.

Then, the server request is received at the client side by client processing program 21 (step 202). Then, client processing program 21 starts client module 211 of the service application at the client computer system (step 203). Starting client module 211 of the service application may involve analyzing the request to determine an identifier of client module 211, to select client module 211 from a number of modules available at the client side and to load and start client module 211. It is also possible that upon receiving and analyzing the request, client processing program 21 retrieves client module 211 from a remote location, for example through a local area or wide area communication network or combinations thereof.

Then, client module 211 generates a client request for server module 111 of the service application (step 204). This client request includes an identifier of server module 111 of the service application. This identifier of server module 111 may alternatively be retrieved from another location, for example, from a list of server modules accessible by the client computer system.

However, it is also possible that information on server module 111 may be already included within the server request received at the client computer system in operation step 202. For example, the server request could include an identifier of server module 111, for example specifying a storage location of server module 111 at the server computer system or specifying other information allowing to identify server module 111. The client request is transmitted in step 204 to the server computer system, where it is received by the server processing program 11 (step 205).

Then, server processing program 11 analyzes the client request and obtains information identifying server module 111 (step 206). Using this information, server processing program 11 selects and retrieves server module 111, for example from secondary storage 108. Server module 111 may be maintained at the server computer system or may be maintained remote from the server computer system, for example at a central database, in which case the server computer system will access the database and retrieve server module 111. After retrieving server module 111, server processing program 11 executes server module 111.

Executing server module 111 may involve a further communication between the server computer system and the client computer system in connection with the execution of the service application.

As described above, the largest part of the service application may thus effectively be executed at the server computer system, while a minimal set of sub-functions of the service application needs to be located at the client computer system. Therefore, server module 111 accessible by and executed through the server computer system may be updated or exchanged without potentially cumbersome access and update operations involving the client computer system. This allows to reduce efforts in maintaining and adapting functionality of the service application, since the operator of the server computer system may access and adapt the second module locally at the server computer system.

Also, in cases where a user operating a client computer system infrequently accesses the server computer system, maintaining the service application in an up-to-date manner could be difficult, if all functionality of the service application would be maintained at the client computer system.

Further, since computationally expensive parts of the service application may be thus located at the server computer system, requirements of processing capabilities and storage capabilities at the client computer system may be reduced.

After completing the execution of server module 111 in step 206, for example, including communications and other operations involved, server processing system 11 system generates a completion indicator indicating that the execution of server module 111 is completed and transmits the completion indicator to the client computer system (step 207).

At the client computer system, client processing program 12 receives the completion indicator (step 208), and releases client module 211 of the service application (step 209). For example, any processes or operations executed in connection with client module 211 do not have to be maintained active after receiving the completion indicator. Since client module 211 is adapted to wait for the completion indicator after execution of server module 111, client module 211 remains active as long as necessary, in order to maintain a synchronization in executing the service application.

The steps of the process depicted in FIG. 2 do not have to be performed within a single communication session between the server computer system and the client computer system. It is also possible that some of the steps of FIG. 2 are executed offline or prior to the communication session involving the client computer system and the server computer system.

For example, step 201 at the server computer system and step 202 at the client computer system, involving generating the server request for client module 211 module of the service application and receiving the server request, may be executed at an arbitrary point in time. For example, in an update operation for updating the functionality of the client computer system, a library of server requests could be established, updated or maintained at the client computer system or a location accessible by the client computer system. In this list of server requests, information relating to a plurality of client modules of a plurality of service applications may be maintained. The list of server requests may be updated either in regular time intervals or may be updated at times selected by a user operating the client computer system.

Accordingly, client module 211 of the service application may be started at the client computer system in step 203 by selecting the corresponding server request from the maintained list of server requests through the user.

Figure 3:
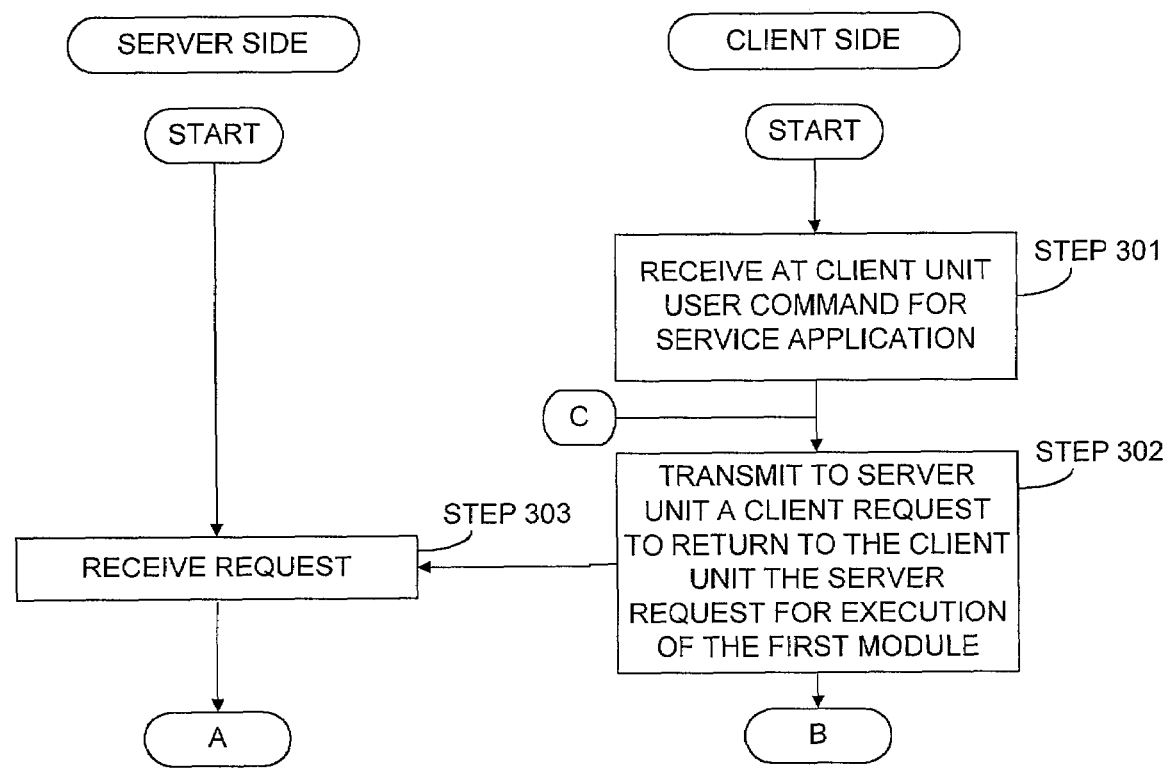
FIG. 3 depicts a flow diagram illustrating exemplary steps that may occur prior to the step of FIG. 2, in accordance with methods, systems, and articles of manufacture consistent with the present invention.

FIG. 3 depicts a flow diagram illustrating exemplary steps that may occur prior to the steps depicts in FIG. 2. The process of FIG. 3 may be performed using system 100 shown in FIG. 1, however, FIG. 3 is not limited thereto.

On the left side of FIG. 3 operations at the server computer system are illustrated, while on the right side of FIG. 3 operations at the client computer system are shown.

Initially, a communication session between the server computer system and the client computer system is be established.

Then, a user inputs a user command for a desired service application, for example, for visualizing a document, printing a document, or rendering a document (step 301). The communication session between the client computer system and the server computer system could also be established after receiving the user command at the client computer system. The user command may be input via a keyboard or may be input by selecting an icon corresponding to the service application on video display 130 of the client computer system.

Then, client processing program 21 transmits to the server computer system a client request, requesting the server computer system to return to the client computer system the server request for executing client module 211 (step 302). In other words, upon receiving the user command at the client side, the client computer system requests from the server computer system to return the server request.

Then, server processing program 11 receives the client request and may appropriately process or analyze the request. Then, the flow illustrated in FIG. 3 may continue with entry points A and B illustrated in FIG. 2. That is, the flow at the server computer system may proceed with step 202, involving transmitting the server request to the client computer system. At the client computer system, the flow may proceed with entry point B, involving receiving the server request for client module 211 in operation step 202.

The steps outlined with respect to FIG. 3 allow flexibility in executing the service application, since the user may enter a command for the service application at the client computer system, for triggering the sequence of operations of FIGS. 2 and 3. This allows the execution of client module 211 at the client computer system, and server module 111 at the server computer system, while maintaining a synchronization in the execution of the modules. That is, client module 211 is released after the completion indicator was received from the server computer system, indicating the completion of execution of server module 111 at the server computer system.

Figure 4:
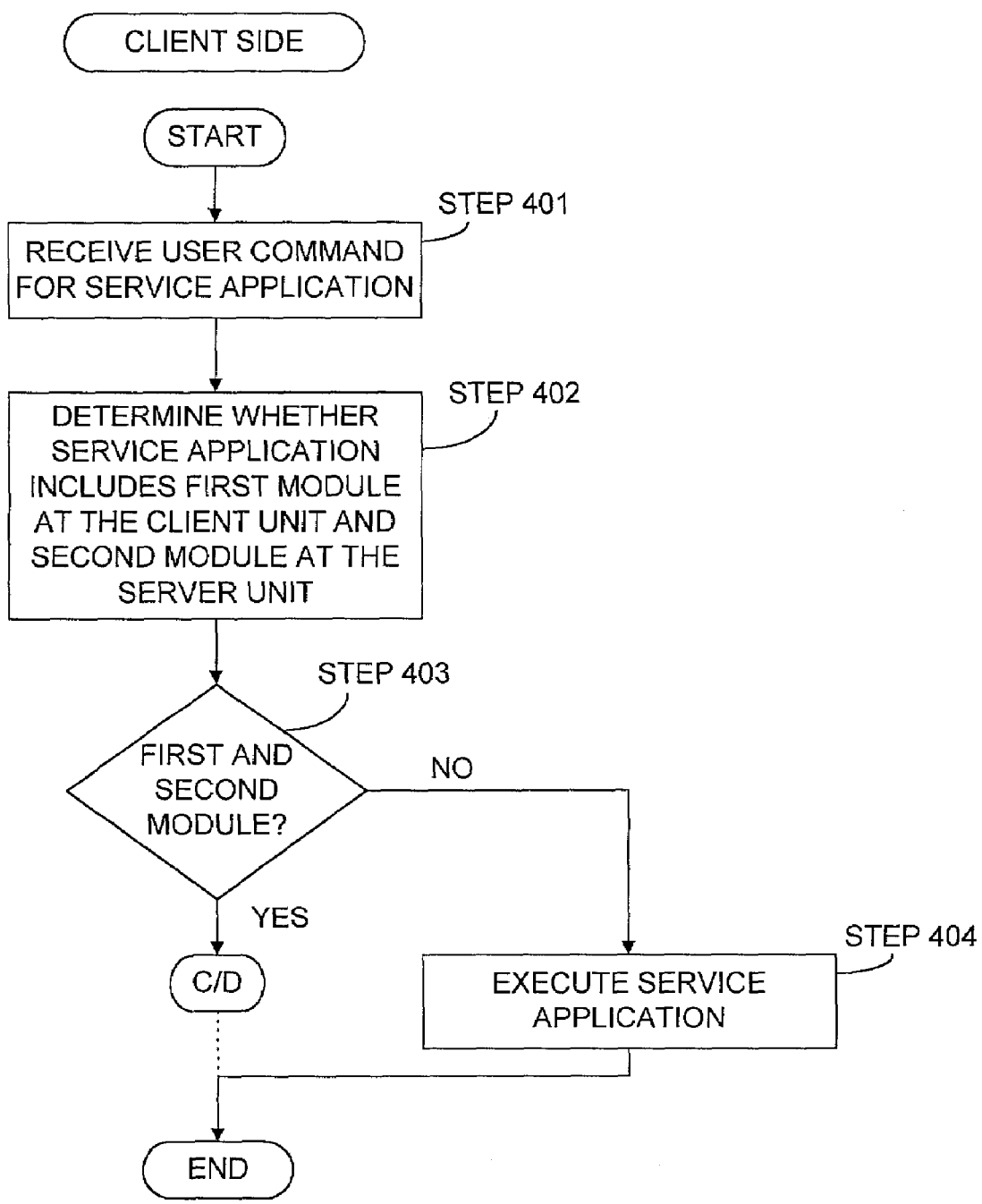
FIG. 4 depicts a flow diagram illustrating exemplary steps for providing remote processing for a client computer system, allowing the categorization of service applications, in accordance with methods, systems, and articles of manufacture consistent with the present invention.

FIG. 4 depicts a flow diagram illustrating exemplary steps for providing remote processing for a client computer system, allowing the categorization of service applications. The exemplary steps described with respect to FIG. 4 may be carried out using the system 100 described in FIG. 1, however, FIG. 4 is not limited thereto.

First, at the client computer system, client processing program 211 receives a user command for a service application (step 401).

Then, client processing program 21 determines whether the requested service application includes client module 211 and server module 111 (step 402). A service application may include further modules at the client computer system or the server computer system. The determining operation may include retrieving and analyzing information on the service application, either from a local storage unit or a storage unit arranged at a remote location. The determining operation can also include retrieving information on the service application from the server computer system or secondary storage 108.

The information on the service application may include identifiers on the modules included in the application or identifiers of locations, such as storage locations maintaining the individual modules of the service application.

Client processing system 21 then determines whether client module 211 and server module 111 are available (step 403). This determination may include retrieving information specifying the service application, for example information included in the service application or retrieved from a data base storing information on service applications.

If client processing program 21 determines that client module 211 and server module 111 are not available in step 403, then client processing program 21 executes the service application (step 404). This may involve executing the service application locally at the client computer system or may include executing the service application at another location, such as the server computer system.

If client processing program 21 determines that client module 211 and server module 111 are available in step 403, then the flow may continue at entry point C of FIG. 3 (i.e., the flow of operations may continue with step 302 of FIG. 3) or the flow may continue at entry point D of FIG. 2 (i.e., the flow of operations may continue with step 203 of FIG. 2.

The operations described with respect to FIG. 4 provide the detection of whether a requested service application includes at least client module 211 and server module 111, or whether the service application is a known service application which can be carried out.

Figure 5:
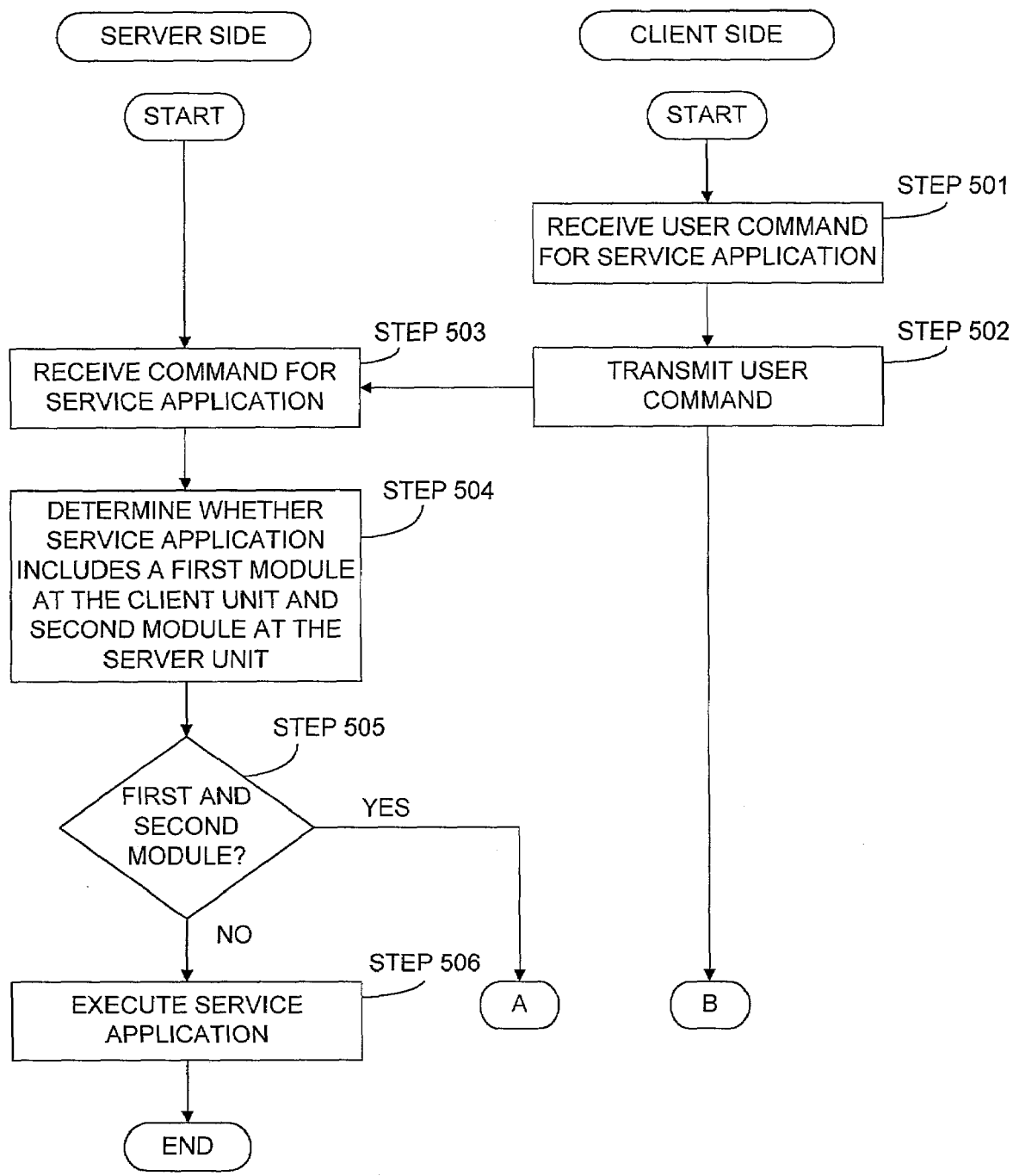
FIG. 5 depicts a flow diagram illustrating exemplary steps for determining whether a requested service application includes at least a client module and a server module, in accordance with methods, systems, and articles of manufacture consistent with the present invention.

FIG. 5 depicts a flow diagram illustrating alternative exemplary steps for determining whether a service application includes client module 211 and server module 111. The steps of FIG. 5 may be carried out using the system 100 shown in FIG. 1, however, FIG. 5 is not limited thereto.

First, client processing program 21 receives a user command for a required service application (step 501).

Then, client processing program 21 transmits the user command to the server computer system (step 502), where it is received by server processing program 11 (step 503).

Then, server processing program 11 determines whether the service application includes client module 211 at the client computer system and server module 111 at the server computer system (step 504).

If server processing program 11 determines that client module 211 and server module 111 are not available in step 505, then the service application is executed (step 506).

If server processing program 11 determines that client module 211 and server module 111 are available in step 505, then the flow at the server computer system may continue at entry point A of FIG. 2 (i.e., the flow of steps may continue with operation 201 of FIG. 2).

Also, subsequent to step 502, the flow of steps at the client computer system may continue at entry point B of FIG. 2 (i.e., the flow of operations may continue with step 202 of FIG. 2).

Accordingly, the server computer system can determine whether the service application is a service application that includes client module 211 at the client computer system and server module 111 at the server computer system.

Figure 6:
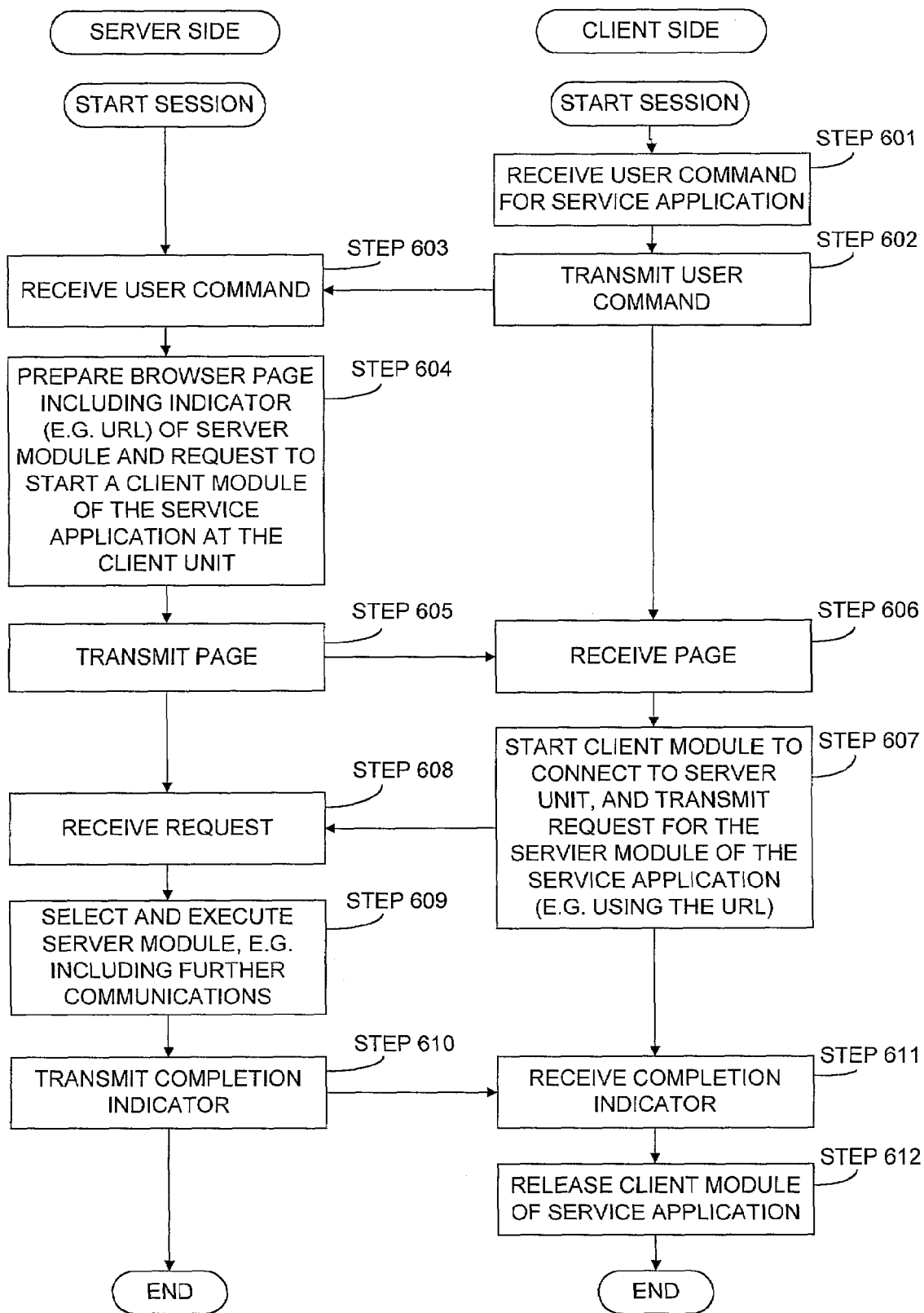
FIG. 6 depicts a flow diagram illustrating exemplary steps for maintaining a synchronization during execution of a service application, in accordance with methods, systems, and articles of manufacture consistent with the present invention.

FIG. 6 depicts a flow diagram illustrating exemplary steps for maintaining a synchronization during executing of a service application. The steps of FIG. 6 may be carried out using the system 100 of FIG. 1, however, FIG. 6 is not limited thereto.

Initially a communication session between the client computer system and the server computer system may be initialized, for example, upon request by a user operating the client computer system.

At the client computer system, client processing program 21 starts a browser application for controlling the communication session between the server computer system and the client computer system. The browser application may be any application available for browsing information on computer networks, such as the Internet. The browser may be adapted to use URLs (Uniform Resource Locators) to specify and retrieve information.

Client module 211 of the requested service application may comprise a plug-in or applet, which may be started upon loading a web page into the browser application executed at the client computer system. Further, client module 211 to be executed at the client computer system may comprise an active X control.

Server module 111 of the service application may comprise a servlet, such as a JAVA-servlet, may be written as ASP (Active Server Page), or may comprise native server code.

If FIG. 6, first, client processing program 21 receives a user command for a service application (step 601). Then, client processing program 21 transmits the user command to the server computer system, for example including information on the type or characteristics of the service application (step 602). For example, the user command could include requesting a print service application and specifying a location for printing the information and further parameters required for printing the information.

The user command and further information, if provided, is received by server processing program 11 (step 603). Then, server processing program 11 analyzes the user command, and, if included, the information on the service application. This may include retrieving information on a client module to be executed at the client computer system and a server module to be executed at the server computer system.

Then, server processing program 11 prepares a server request including an indicator of server module 111 and information instructing the execution of client module 211 of the service application at the client computer system (step 604). For example, server processing program 11 may prepare a browser page including an indicator (Uniform Resource Locator) of server module 111 specified in a URL. This may be convenient, as many browsers for browsing information on computer networks include URLs to specify and retrieve information.

Server processing program 11 then transmits the web page to the client side where it is received by client processing program 21 (step 606).

Then, client processing program 21 starts client module 211, for example, upon loading the web page into the browser (step 607). The web page may also include program applets, such as JAVA applets, supporting starting client module 211 of the service application. Then, in step 607, client module 211 generates the request for server module 111 of the service application, which may include the URL received in step 606 from the server computer system.

If a URL specifying server module 111 was not included into the server request received in step 606, the URL may be locally generated by client processing program 21 or may be retrieved from a third location.

Then, client processing program 21 transmits the request for server module 111 to the server computer system where it is received by server processing program 11 (step 608).

Then, server processing program 111 analyzes the request, and based on the information on server module 111 (e.g., the URL specifying server module 111), server module 111 is selected, for example from a list of modules available at the server computer system (step 609). Then, server processing program 11 executes server module 111 at the server computer system. For example, server module 111 may be scripted or processed by server processing program 11, in a case where server module 111 comprises, for example, a servlet or an active server page. Executing the server module may include further communications with the client computer system and other computer systems, as described above.

Then, after completion of operations in association with server module 111, a server processing program 11 generates a completion indicator and transmits it to the client side (step 610), where it is received by client processing program 21 (step 611). The completion indicator may be included in a response to the URL received from the client computer system.

Thus, since the URL specifying server module 111 was transmitted from the client computer system, the client computer system will maintain client module 211 active as long as a response to the URL is not returned to the client computer system, even if another web page is loaded into the browser. Thus, client module 211 remains active as long as the completion indicator, for example included in an expected response to the URL, is not received.

Then, after client processing program 21 receives the completion indicator in step 611, client processing program 21 releases client module 111 of the service application (e.g., the URL sent from client module 211 is served by the completion indicator) (step 612).

The steps depicted with respect to FIG. 6 allow the employment of URLs in executing the service application. Since a client module (e.g., a plug-in or applet) remains active until another web page is loaded into the server, transmitting the URL from the client module to the server computer system and expecting a response to the URL (i.e., the completion indicator) effects that the client module is maintained active at the client computer system until the completion indicator is received. Thus, a synchronization between the client computer system and the server computer system in executing the requested service application may be maintained, as required.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. The invention may be implemented with both object-oriented and non-object-oriented programming systems. The scope of the invention is defined by the claims and their equivalents.

What is claimed is:

1. A method in a data processing system having a client and a server, the method for remote processing at the client, the client having a first component of a service application, the server having a second component of the service application, the method comprising the steps of:

receiving a user command to execute the service application;

determining whether the service application includes the first component and the second component; and when it is determined that the service application includes the first component and the second component, receiving from the server a request to execute the first component, initiating execution of the first component based on the received request, after initiating execution of the first component, instructing the server to initiate execution of the second component, receiving a completion indicator from the server indicating that the second component has terminated execution, and automatically terminating execution of the first component responsive to receipt of the completion indicators, wherein:
the request to execute the first component is included in a web page with a URL identifying the second component,
the server is instructed to initiate execution of the second component by returning the URL to the server, and
the received completion indicator from the server is included in a response to the returned URL from the client.

2. The method of claim 1, further comprising the steps of:
receiving a user command to execute the service application; and requesting the server to send the request to execute the first component.

3. The method of claim 1, wherein the server request includes an identifier of the second component of the service application.

4. The method of claim 1, further comprising the steps of:
determining whether the first component and the second component are available for execution.

5. The method of claim 1, wherein the server is a web server.

6. The method of claim 1, wherein the first component comprises one of a plug-in and an applet, which is executed by loading a web page in a browser application executed at the client; and wherein the second component comprises a servlet scripted at the server.

7. The method of claim 1, wherein the service application comprises at least one application selected from the group consisting of a print operation, a visualization operation, a storing operation a rendering operation, a mathematical operation, and a logical operation.

8. A method in a data processing system having a client and a server, the method for remote processing at the server, the client having a first component of a service application, a server having a second component of the service application, the method comprising the steps of:
receiving a user command to execute the service application;
determining whether the service application includes the first component and the second component; and
when it is determined that the service application includes the first component and the second component,
requesting the client to initiate execution of the first component and to return a client request to the server to initiate execution of the second component,
receiving the request to initiate execution of the second component,
initiating execution of the second component based on the received client request,
determining when the second component has terminated executions, and
when it is determined tat the second component has terminated execution, sending an indication to the client that the second component has terminated execution to notify the client to automatically terminate execution of the first component,
wherein:
the request to initiate execution of the first component is included in a web page with a URL identifying the second component;
receiving the URL with the client request instructing the server to initiate execution of the second component; and
the client is notified with the completion indicator in a response to the client request having the URL.

9. The method of claim 8, further comprising the step of:
receiving a further client request instructing the server to request the client to initiate execution of the first component.

10. The method of claim 8, wherein the request to the client to initiate execution of the first component includes an identifier of the second component.

11. The method of claim 8, further comprising the step of:
determining whether the first component and the second component are available for execution.

12. The method of claim 8, wherein the server is a web server.

13. The method of claim 8, wherein the first component comprises one of a plug-in and an applet, which is executed by loading a web page in a browser application executed at the client, and wherein the second component comprises a servlet scripted at the server.

14. The method of claim 8, wherein the service application comprises at least one application selected from the group consisting of a print operation, a visualization operation, a storing operation a rendering operation, a mathematical operation, and a logical operation.

15. A computer-readable storage medium containing instructions that cause a data processing system having a client and a server to perform a method for remote processing at the client, the client having a first component of a service application, the server having a second component of the service application, the method comprising the steps of:
receiving a user command to execute the service application:
determining whether the service application includes the first component and the second component; and
when it is determined that the service application includes the first component and the second component,
receiving from the server a request to execute the first component,
initiating execution of the first component based on the received request,
after initiating execution of the first component, instructing the server to initiate execution of the second component,
receiving a completion indicator from the server indicating that the second component has terminated executions, and
automatically terminating execution of the first component responsive to receipt of the completion indicator,
wherein:
the request to execute the first component is included in a web page with a URL identifying the second component,
the server is instructed to initiate execution of the second component by returning the URL to the server, and
the received completion indicator from the server is included in a response to the returned URL from the client.

16. The computer-readable storage medium of claim 15, further comprising the steps of:
receiving a user command to execute the service application; and
requesting the server to send the request to execute the first component.

17. The computer-readable storage medium of claim 15, wherein the request to execute the first component includes an identifier of the second component of the service application.

18. The computer-readable storage medium of claim 15, further comprising the steps of:
  determining whether the first component and the second component are available for execution.

19. The computer-readable storage medium of claim 15, wherein the server is a web server.

20. The computer-readable storage medium of claim 15, wherein the first component comprises one of a plug-in and an applet, which is executed by loading a web page in a browser application executed at the client; and wherein the second component comprises a servlet scripted at the server.

21. The computer-readable storage medium of claim 15, wherein the service application comprises at least one application selected from the group consisting of a print operation, a visualization operation, a storing operation a rendering operation, a mathematical operation, and a logical operation.

22. A computer-readable storage medium containing instructions that cause a data processing system having a client and a server to perform a method for remote processing at the server, the client having a first component of a service application, the server having a second component of the service application, the method comprising the steps of:
  receiving a user command to execute the service application;
  determining whether the service application includes the first component and the second component; and
  when it is determined that the service application includes the first component and the second component,
    requesting the client to initiate execution of the first component and to return a client request to the server to initiate execution of the second component,
    receiving the client request to initiate execution of the second component,
    initiating execution of the second component based on the received client request,
    determining when the second component has terminated execution, and
    when it is determined that the second component has terminated execution, sending an indication to the client that the second component has terminated execution to notify the client to automatically terminate execution of the first component,
  wherein:
    the request to execute the first component is included in a web page with a URL identifying the second component;
    receiving the URL with the client request instructing the server to initiate execution of the second component; and
    the client is notified with the completion indicator in a response to the client request having the URL.

23. The computer-readable storage medium of claim 22, further comprising the step of:
  receiving a second client request instructing the server to request the client to initiate execution of the first component.

24. The computer-readable storage medium of claim 22, wherein the request to the client to initiate execution of the first component includes an identifier of the second component.

25. The computer-readable storage medium of claim 22, further comprising the step of:
  determining whether the first component and the second component are available for execution.

26. The computer-readable storage medium of claim 22, wherein the server is a web server.

27. The computer-readable storage medium of claim 22, wherein the first component comprises one of a plug-in and an applet, which is executed by loading a web page in a browser application executed at the client; and wherein the second component comprises a servlet scripted at the server.

28. The computer-readable storage medium of claim 22, wherein the service application comprises at least one application selected from the group consisting of a print operation, a visualization operation, a storing operation a rendering operation, a mathematical operation, and a logical operation.

29. A client data processing system comprising:
  a memory comprising a service application with a first component and a second component, and a computer program that
    receives a user command to execute the service application;
    determines whether the service application includes the first component and the second component, and
    when it is determined that the service application includes the first component and the second component,
      receives from a server a request to execute the first component,
      initiates execution of the first component based on the received request,
      instructs the server to initiate execution of the second component of the service application program located at the server after initiating execution of the first component,
      receives a completion indicator from the server indicating that the second component has terminated execution, and
      automatically terminates execution of the first component responsive to receipt of the completion indicator; and
  a processing unit that runs the computer program,
  wherein:
    the request to initiate execution of the first component is included in a web page with a URL identifying the second component,
    the server is instructed to initiate execution of the second component by returning the URL to the server, and
    the received completion indicator from the server is included in a response to the returned URL from the client.

30. The data processing system of claim 29, wherein the server is a web server.

31. A server data processing system comprising:
  a memory comprising a service application having a first component and a second component, and a computer program that
    receives a user command to execute the service application,
    determines whether the service application includes the first component and the second component, and
    when it is determined that the service application includes the first component and the second component, requests a client to initiate execution of the first component of the service application program located at the client and to return a client request to initiate execution of the second component,
receives the client request to initiate execution of the second component,
initiates execution of the second component based on the received client request,
determines when the second component has terminated execution, and
when it is determined that the second component has terminated execution, sends an indication to the client that the second component has terminated execution to notify the client to automatically terminate execution of the first component; and a processing unit that runs the computer program, wherein:
the request to initiate execution of the first component is included in a web page with a URL identifying the second component;
receiving the URL with the client request instructing the server to initiate execution of the second component; and
the client is notified with the completion indicator in a response to the client request having the URL.

32. The data processing system of claim 31 wherein the sewer is a web server.

33. A data processing system having a client and a server, the data processing system for remote processing at the client, the client having a first component of a service application, the server having a second component of the service application, the data processing system comprising;

means for receiving a user command to execute the service application;
means for determining whether the service application includes the first component and the second component; and
means for, when it is determined that the service application includes the first component and the second component,
receiving from the server a request to execute the first component;
initiating execution of the first component based on the received request;
after initiating execution of the first component instructing the server to initiate execution of the second component;
receiving a completion indicator from the server indicating that the second component has terminated execution; and
automatically terminating execution of the first component responsive to receipt of the completion indicator,
wherein:
the request to initiate execution of the first component is included in a web page with a URL identifying the second component;
receiving the URL with the client request instructing the server to initiate execution of the second component; and
the client is notified with the completion indicator in a response to the client request having the URL.

* * * * *